US009360057B2

(12) United States Patent
Mogi (10) Patent No.: US 9,360,057 B2
(45) Date of Patent: Jun. 7, 2016

(54) ELECTROMAGNETIC CLUTCH (71) Applicant: SANDEN CORPORATION, Isesaki-shi (JP)

(72) Inventor: Masanori Mogi, Isesaki (JP)

(73) Assignee: SANDEN CORPORATION, Gunma (JP)

( * ) Notice: Subject to any disclaimer, the term of this patent is extended or adjusted under 35 U.S.C. 154(b) by 0 days.

(21) Appl. No.: 14/380,636

(22) PCT Filed: Feb. 15, 2013

(86) PCT No.: PCT/JP2013/053635
§ 371 (c)(1),
(2) Date: Aug. 22, 2014

(87) PCT Pub. No.: WO2013/125452
PCT Pub. Date: Aug. 29, 2013

(65) Prior Publication Data
US 2015/0014117 A1    Jan. 15, 2015

(30) Foreign Application Priority Data
Feb. 23, 2012    (JP) .................................. 2012-038051

(51) Int. Cl.
*F16D 27/112*    (2006.01)
*F16D 27/14*    (2006.01)
(Continued)

(52) U.S. Cl.
CPC .............. *F16D 27/112* (2013.01); *F16D 27/14* (2013.01); *H01F 5/02* (2013.01); *H01F 7/127* (2013.01); *F16D 2027/001* (2013.01)

(58) Field of Classification Search
CPC .................... F16D 2027/001; F16D 2027/005; H01F 7/128; H01F 2007/062
See application file for complete search history.

(56) References Cited

U.S. PATENT DOCUMENTS

| 5,250,921 A | 10/1993 | Van Laningham et al. |
| 5,320,206 A * | 6/1994 | Maejima ............... F16D 27/112 192/84.961 |

(Continued)

FOREIGN PATENT DOCUMENTS

| CN | 1415866 | 5/2003 |
| CN | 1745256 | 3/2006 |

(Continued)

OTHER PUBLICATIONS

Machine translation of JP 2000-179581 downdloaded from epo.org on Sep. 25, 2015.*

*Primary Examiner* — Richard Lorence
(74) *Attorney, Agent, or Firm* — Cozen O'Connor (57) ABSTRACT

An electromagnetic clutch can be manufactured with reduced steps and cost. In the electromagnetic clutch, an electromagnetic coil unit 4 for causing a rotor and an armature to magnetically adhere to each other to enable power transmission from a drive source to a driven device includes: a bobbin 42 around which an electromagnetic coil 41 is wound; a power supply connector 43 attached to a connector mounting portion 424 formed in the bobbin 42, to supply external power to the electromagnetic coil 41; and a field core 44 in which a through hole 443a is formed. In the field core 44, a proximal part of the power supply connector 43 and the bobbin 42 are stored in a storage portion in a state where a distal part of the power supply connector 43 is exposed to outside from the through hole 443a, and the storage portion is filled with resin.

8 Claims, 5 Drawing Sheets (51) Int. Cl.
*H01F 5/02* (2006.01)
*H01F 7/127* (2006.01)
*F16D 27/00* (2006.01)

(56) References Cited

U.S. PATENT DOCUMENTS

| | | | | |
|---|---|---|---|---|
| 5,967,282 | A * | 10/1999 | Takahashi | F16D 27/112 192/84.961 |
| 6,512,440 | B2 * | 1/2003 | Suda | H01F 5/04 336/107 |
| 2003/0096522 | A1 | 5/2003 | Fuju | |
| 2006/1007702 | | 4/2006 | Chung | |
| 2010/0017581 | A1 | 1/2010 | Clift et al. | |

FOREIGN PATENT DOCUMENTS

| | | |
|---|---|---|
| CN | 1757945 | 4/2006 |
| JP | 04-64623 | 6/1992 |
| JP | 4-290617 | 10/1992 |
| JP | 08-005385 | 2/1996 |
| JP | 08-219178 | 8/1996 |
| JP | 09-296830 | 11/1997 |
| JP | 2000-179581 | 6/2000 |
| JP | 2000-357563 | 12/2000 |
| JP | 2001-99193 | 4/2001 |
| JP | 2003-130087 | 5/2003 |
| JP | 2006-349119 | 12/2006 |
| JP | 2007-46625 | 2/2007 |

* cited by examiner

ELECTROMAGNETIC CLUTCH

RELATED APPLICATIONS

This is a U.S. National stage of International application No. PCT/JP2013/053635 filed on Feb. 15, 2013.

This patent application claims the priority of Japanese application no. 2012-038051 filed Feb. 23, 2012 the disclosure content of which is hereby incorporated by reference.

TECHNICAL FIELD

The present invention relates to an electromagnetic clutch, and particularly relates to an electromagnetic clutch suitable for intermittently transmitting power of an engine or a motor of a vehicle to a vehicle-mounted device (such as a compressor in an air conditioner of the vehicle).

BACKGROUND ART

As this type of electromagnetic clutch, an electromagnetic clutch disclosed in Patent Document 1 is known as an example. The electromagnetic clutch disclosed in Patent Document 1 includes: a ring-shaped yoke in which an electromagnetic coil is fixed by a resin material; and an insulation case fixed to the back of the yoke by caulking. Lead wires for supplying power and the ends of the electromagnetic coil are connected by terminal members in the insulation case, and the insulation case is filled with a resin material to make these connected parts waterproof.

REFERENCE DOCUMENT LIST

Patent Document

Patent Document 1: Japanese Patent Application Laid-open Publication No. H09-296830

SUMMARY OF THE INVENTION

Problems to be Solved by the Invention

In the above-mentioned electromagnetic clutch, the electromagnetic coil is fixed in the yoke by the resin material, and also the insulation case is filled with the resin material. This ensures insulation performance, waterproof performance, and the like in the electromagnetic clutch.

In the case of manufacturing this electromagnetic clutch, however, at least the following steps are necessary: a step of incorporating the electromagnetic coil into the yoke; a step of filling the yoke with the resin material to fix the electromagnetic coil to the yoke; a step of fixing the insulation case to the back of the yoke by caulking; a step of connecting the lead wires and the ends of the electromagnetic coil in the insulation case; and a step of filling the insulation case with the resin material. The electromagnetic clutch thus has a problem of requiring many manufacturing steps and high manufacturing cost.

The present invention has been made in view of such circumstances, and it has an object of providing an electromagnetic clutch that can be manufactured with fewer steps and at lower cost.

Means for Solving the Problems

According to an aspect of the present invention, an electromagnetic clutch for intermittently transmitting power of a drive source to a driven device includes: a rotor rotated by the power of the drive source; an armature facing the rotor, and connected to a rotary shaft of the driven device; and an electromagnetic coil unit having an electromagnetic coil, and for causing, when power is supplied to the electromagnetic coil, the rotor and the armature to magnetically adhere to each other to enable the transmission of the power from the drive source to the driven device.

The electromagnetic coil unit includes: a bobbin having a connector mounting portion, and around which the electromagnetic coil is wound; a power supply connector attached to the connector mounting portion, to supply external power to the electromagnetic coil; and a field core having a storage portion in which a through hole is formed, a proximal part of the power supply connector and the bobbin being stored in the storage portion in a state in which a distal part of the power supply connector is exposed to outside from the through hole, and the storage portion being filled with resin.

Effects of the Invention

The electromagnetic coil unit in the electromagnetic clutch can be manufactured by attaching the power supply connector to the bobbin around which the electromagnetic coil is wound, storing the bobbin to which the power supply connector is attached in the storage portion of the field core, and then filling the storage portion with resin only once. Insulation performance and waterproof performance are ensured in this way. The electromagnetic coil unit can thus be manufactured easily and the number of manufacturing steps and the manufacturing cost of the electromagnetic clutch can be reduced significantly, as compared with the conventional technique.

MODE FOR CARRYING OUT THE INVENTION

An embodiment of the present invention is described below with reference to the attached drawings.

Figure 1:
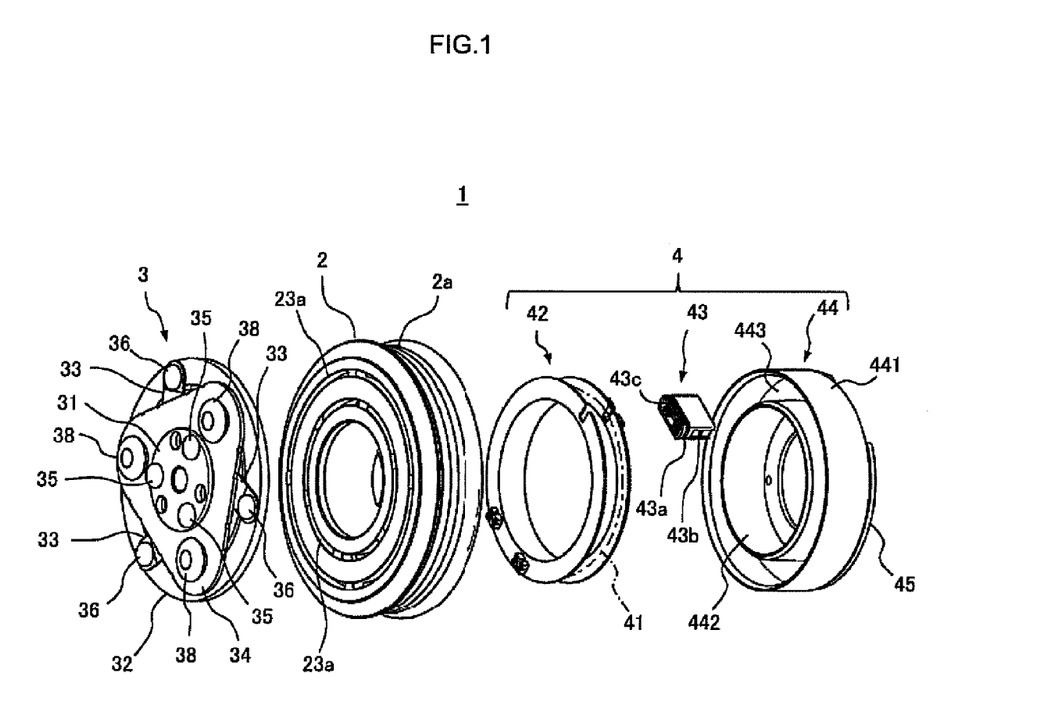
FIG. 1 is an exploded perspective view of an electromagnetic clutch according to an embodiment of the present invention.
Figure 2:
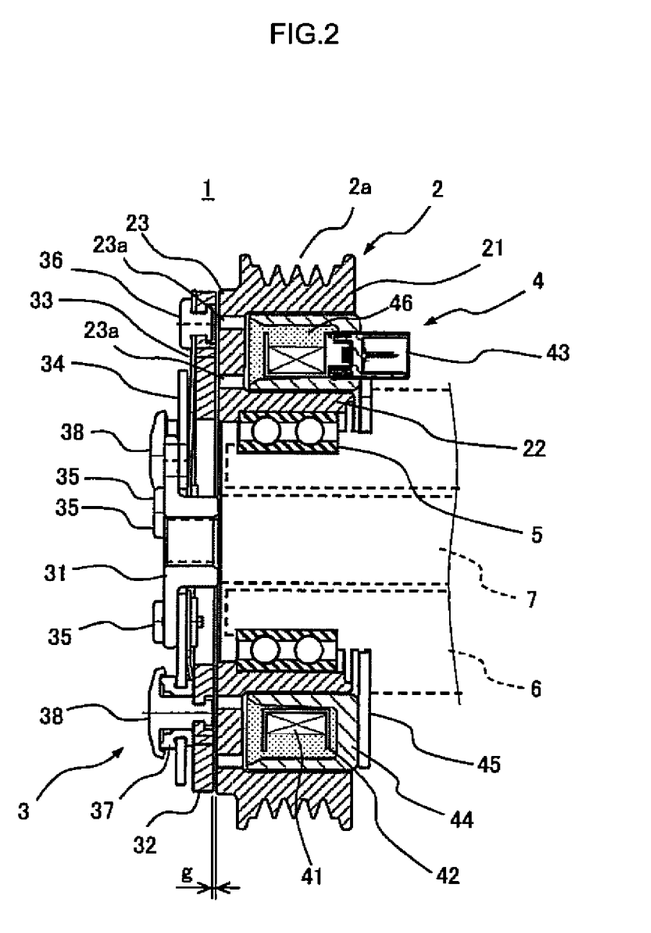
FIG. 2 is a sectional view of the electromagnetic clutch.

FIGS. 1 and 2 illustrate the structure of an electromagnetic clutch 1 according to an embodiment of the present invention. FIG. 1 is an exploded perspective view of the electromagnetic clutch 1, and FIG. 2 is a sectional view of the electromagnetic clutch 1.

For example, the electromagnetic clutch 1 according to this embodiment is incorporated in a compressor in an air conditioner of a vehicle, and intermittently transmits power of an engine or a motor of the vehicle as a drive source to the compressor as a driven device. In detail, the electromagnetic clutch 1 switches state between power transmission from the engine or the motor to the compressor and interruption of power transmission. The compressor operates when power is transmitted from the engine or the motor, and stops operation when power from the engine or the motor is interrupted.

The electromagnetic clutch 1 includes: a rotor 2 rotated by power from the engine or the motor; an armature 3 facing the rotor 2; and an electromagnetic coil unit 4 for causing the rotor 2 and the armature 3 to magnetically adhere to each other, as illustrated in FIGS. 1 and 2.

The rotor 2 is ring-shaped, and its inner peripheral surface is rotatably supported by the outer peripheral surface of a housing 6 (indicated by dashed lines in FIG. 2) of the compressor via a bearing 5. A belt groove 2a is formed on the outer peripheral surface of the rotor 2, and the outer peripheral surface of the rotor 2 functions as a pulley. In more detail, the rotor 2 includes: an outer cylindrical portion 21 having the outer peripheral surface; an inner cylindrical portion 22 having the inner peripheral surface and concentric with the outer cylindrical portion 21; and an annular disk-shaped connecting portion 23 connecting the outer cylindrical portion 21 and the inner cylindrical portion 22 at one end. These are integrated to form the rotor 2 (see FIG. 2). The connecting portion 23 serving as one end surface of the rotor 2 has slits 23a intermittently extending in the circumferential direction, as a magnetic flux blocking portion.

A drive belt (not illustrated) is attached to the outer peripheral surface of the rotor 2 on which the belt groove 2a is formed. The rotor 2 is rotated by the power of the engine or the motor transmitted via the drive belt. The electromagnetic coil unit 4, described later, is placed in the space defined by the outer cylindrical portion 21, the inner cylindrical portion 22, and the connecting portion 23.

The armature 3 includes: a cylindrical hub 31 having a flange portion; a disk-shaped armature plate 32 made of a magnetic material; a plurality of (three in this example) leaf springs 33; and a damping plate 34 shaped like a triangular plate.

The hub 31 is fixed (connected) to one end of a rotary shaft (drive shaft) 7 (indicated by dashed lines in FIG. 2) of the compressor protruding out of the housing 6 by a nut (not illustrated), in a spline-engaged state as an example.

The armature plate 32 faces the end surface (the connecting portion 23) of the rotor 2.

Each of the leaf springs 33 has one end fixed to the flange portion of the hub 31 by a rivet 35 together with the damping plate 34, and the other end fixed to the armature plate 32 by a rivet 36. Each of the leaf springs 33 biases the armature plate 32 away from the end surface (the connecting portion 23) of the rotor 2. This creates a predetermined gap g between the end surface (the connecting portion 23) of the rotor 2 and the armature plate 32.

The damping plate 34 has antivibration rubber 37 attached to near each vertex. The damping plate 34 and the antivibration rubber 37 are fixed to the armature plate 32 by a rivet 38, and damp vibrations generated in the armature plate 32.

The electromagnetic coil unit 4 includes: an electromagnetic coil 41 (indicated by an alternate long and short dashed line in FIG. 1); a bobbin 42 around which the electromagnetic coil 41 is wound; a power supply connector 43 attached to the bobbin 42; and a field core 44.

A mounting plate 45 is attached to one end surface of the field core 44. The electromagnetic coil unit 4 is stored in the above-mentioned space (i.e. the space defined by the outer cylindrical portion 21, the inner cylindrical portion 22, and the connecting portion 23) of the rotor 2, in a state of being mounted on (fixed to) the housing 6 of the compressor via the mounting plate 45 (see FIG. 2).

When the electromagnetic coil unit 4 is supplied with external power via the power supply connector 43, the electromagnetic coil 41 is energized to generate an electromagnetic force, to cause the armature plate 32 to magnetically adhere to the end surface (the connecting portion 23) of the rotor 2 against the biasing force of the leaf springs 33. The rotor 2 and the armature 3 are thus connected. The rotary force of the rotor 2 (i.e. the power of the engine or the motor) is transmitted to the armature 3, and is further transmitted to the rotary shaft 7 of the compressor, as a result of which the compressor operates.

When the power supply to the electromagnetic coil unit 4 is stopped, on the other hand, the armature plate 32 is separated from the end surface (the connecting portion 23) of the rotor 2 by the biasing force of the leaf springs 33. The transmission of the rotary force of the rotor 2 is thus interrupted, as a result of which the compressor stops.

Figure 3:
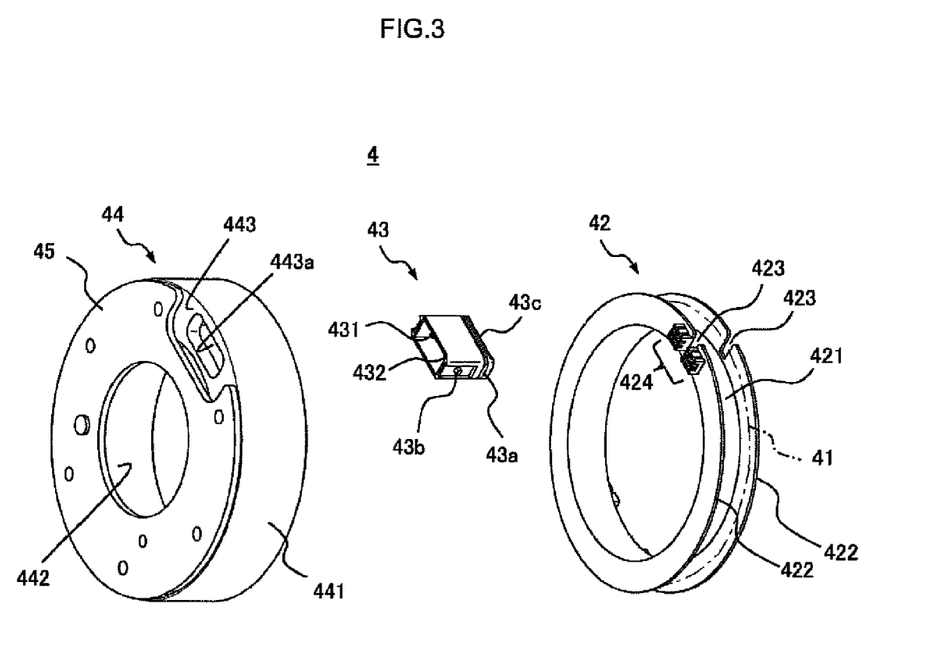
FIG. 3 is an exploded perspective view of an electromagnetic coil unit.

FIG. 3 is an exploded perspective view of the electromagnetic coil unit 4 seen from the opposite side to FIG. 1.

As illustrated in FIG. 3, the bobbin 42 includes: a cylindrical portion 421 having the electromagnetic coil 41 wound around its outer peripheral surface; and flange portions 422 provided on both ends of the cylindrical portion 421. A notch 423 is formed in part of the outer periphery of each of the flange portions 422, and a connector mounting portion 424 to which the power supply connector 43 is attached is provided on the outer surface of one of the flange portions 422. The connector mounting portion 424 may be formed integrally with the bobbin 42 (the flange portion 422), or formed as a separate unit and fixed to the bobbin 42 (the flange portion 422).

The connector mounting portion 424 is provided on the outer surface of the flange portion 422 so that the connector mounting portion 424 sandwiches the notch 423. In detail, the connector mounting portion 424 is divided into a left part situated on the left of the notch 423 and a right part situated on the right of the notch 423, as seen from the outside of the flange portion 422. However, the present invention is not limited to this, so long as the connector mounting portion 424 is near the notch 423.

Figure 4:
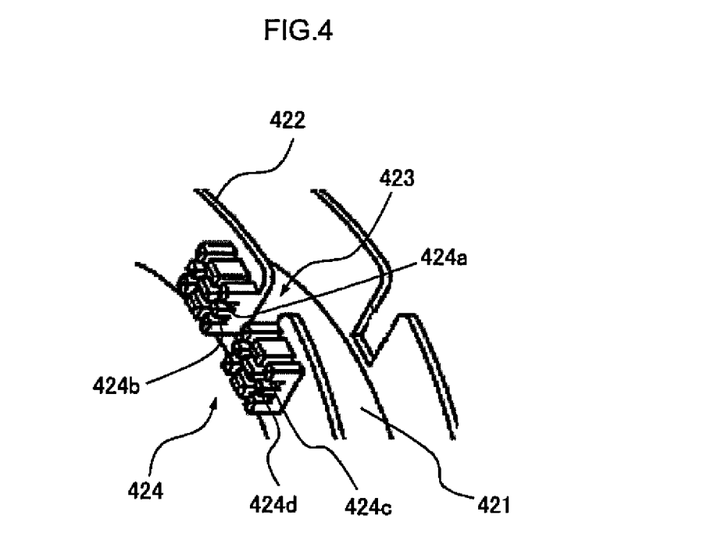
FIG. 4 is an enlarged view of a connector mounting portion.

FIG. 4 is an enlarged view of the connector mounting portion 424.

As illustrated in FIG. 4, the left part of the connector mounting portion 424 has: a first groove portion 424a extending away from the notch 423 along the outer surface of the flange portion 422; and a second groove portion 424b extending in parallel with the first groove portion 424a. Likewise, the right part of the connector mounting portion 424 has: a third groove portion 424c extending away from the notch 423 along the outer surface of the flange portion 422; and a fourth groove portion 424d extending in parallel with the third groove portion 424c.

Both ends of the electromagnetic coil 41 wound around the outer peripheral surface of the cylindrical portion 421 are each fitted in a different one of the first groove portion 424a and the third groove portion 424c. In detail, both ends of the electromagnetic coil 41 wound around the outer peripheral surface of the cylindrical portion 421 are drawn out of the flange portion 422 through the notch 423, and then bent opposite to each other and fitted in the first groove portion 424a and the third groove portion 424c. Meanwhile, lead wires of a diode (back surge absorber) (not illustrated) are fitted in a different one of the second groove portion 424b and the fourth groove portion 424d. Though the connector mounting portion 424 has the second groove portion 424b and the fourth groove portion 424d in which the lead wires of the diode are fitted in this example, the connector mounting portion 424 may have only the first groove portion 424a and the third groove portion 424c in which the ends of the electromagnetic coil 41 are fitted.

The first groove portion 424a and the third groove portion 424c correspond to "a first coil groove portion" and "a second coil groove portion" in the present invention.

The power supply connector 43 is attached to (press-fitted to) the connector mounting portion 424 of the bobbin 42, and supplies power to the electromagnetic coil 41 when connected to a power connector (not illustrated). A collar portion 43a protruding outward is formed on the outer peripheral surface of the power supply connector 43. A locking portion 43b for locking the power connector is formed on the outer peripheral surface of the power supply connector 43 at a position that is closer to the distal end than the collar portion 43a is. A depression 43c is formed on the outer peripheral surface of the power supply connector 43 at a position that is closer to the proximal end than the collar portion 43a is.

In this embodiment, the depression 43c is formed on each of two opposite surfaces (surfaces on which the locking portion 43b is not formed) of the outer peripheral surface of the power supply connector 43. However, the present invention is not limited to this, so long as at least one depression 43c is formed on the outer peripheral surface of the power supply connector 43 at a position that is closer to the proximal end than the collar portion 43a is.

Figure 5:
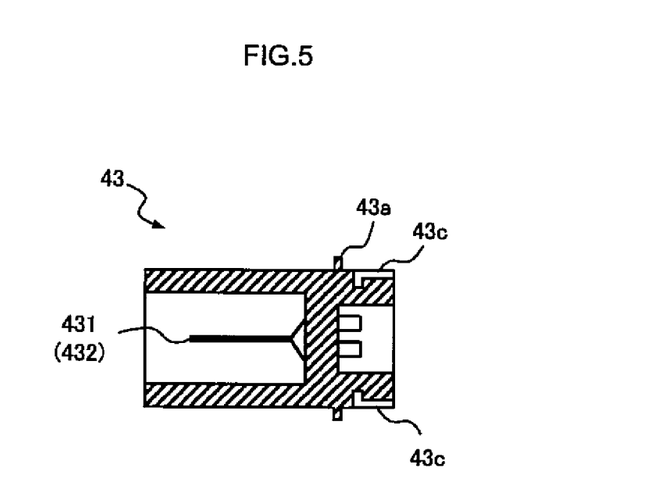
FIG. 5 is an enlarged sectional view of a power supply connector.

Though the depression 43c is not limited to any particular shape, it is preferable that the depression 43c has a predetermined width (length) from the proximal end toward the distal end of the power supply connector 43, and has a deepest part at a position that is closer to the distal end than the proximal end is. The depression 43c may gradually increase in depth from the proximal end, or be partially deeper at a predetermined distance from the proximal end than at the other positions. More preferably, the depression 43c is shaped like a hook in cross section, as illustrated in FIG. 5 (an enlarged sectional view of the power supply connector).

The power supply connector 43 also includes: a first connector pin 431 electrically connected to one end of the electromagnetic coil 41 fitted in the first groove portion 424a and one lead wire of the diode fitted in the second groove portion 424b when the power supply connector 43 is attached to the bobbin 42 (the connector mounting portion 424); and a second connector pin 432 electrically connected to the other end of the electromagnetic coil 41 fitted in the third groove portion 424c and the other lead wire of the diode fitted in the fourth groove portion 424d when the power supply connector 43 is attached to the bobbin 42 (the connector mounting portion 424), as illustrated in FIG. 3.

The field core 44 is ring-shaped like the rotor 2, as illustrated in FIGS. 1 to 3. In detail, the field core 44 includes: an outer cylindrical portion 441; an inner cylindrical portion 442 concentric with the outer cylindrical portion 441; and an annular disk-shaped connecting portion 443 connecting the outer cylindrical portion 441 and the inner cylindrical portion 442 at one end. The connecting portion 443 has a through hole 443a. The through hole 443a corresponds in size to the power supply connector 43. In more detail, the through hole 443a has an opening area larger than the cross-sectional area of the power supply connector 43 on the distal side and smaller than the cross-sectional area of the collar portion 43a. The mounting plate 45 is attached to the outer surface of the connecting portion 443.

Figure 6A:
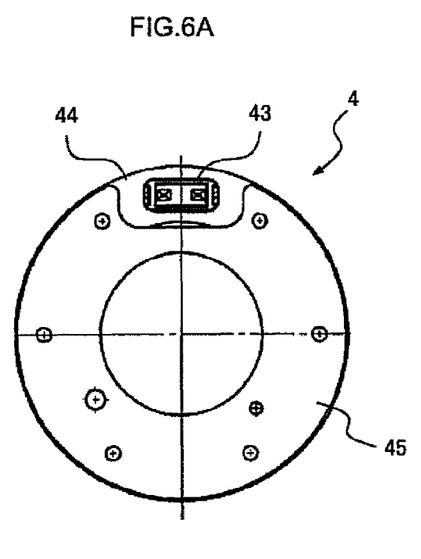
FIG. 6 is an assembly view of the electromagnetic coil unit.
Figure 6B:
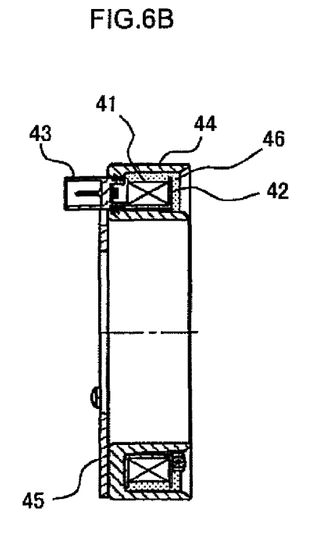
Figure 6C:
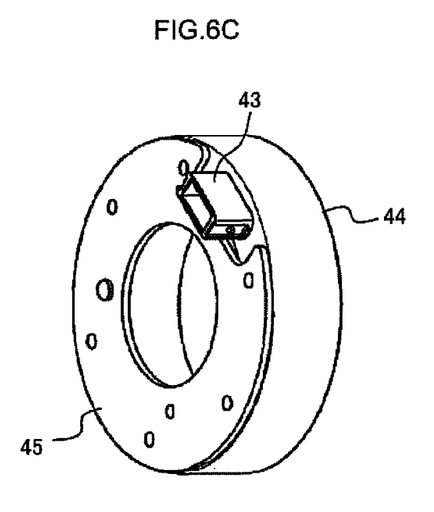

The field core 44 stores the bobbin 42 to which the power supply connector 43 is attached, in the space defined by the outer cylindrical portion 441, the inner cylindrical portion 442, and the connecting portion 443. In more detail, the field core 44 stores the proximal part of the power supply connector 43 and the bobbin 42 in the above-mentioned space in a state in which the distal part of the power supply connector 43 is exposed to the outside from the through hole 443a, as illustrated in FIGS. 6A to 6C. The space is then filled with resin 46. The resin with which the space is filled seals the electromagnetic coil 41, and integrates the electromagnetic coil 41, the bobbin 42, the power supply connector 43, and the field core 44 to form the electromagnetic coil unit 4.

The space defined by the outer cylindrical portion 441, the inner cylindrical portion 442, and the connecting portion 443 corresponds to "a storage portion in which a through hole is formed" in the present invention.

The following briefly describes an example of the assembly procedure of the electromagnetic coil unit 4.

First, the electromagnetic coil 41 is wound around the outer peripheral surface of the cylindrical portion 421 of the bobbin 42, and both ends of the electromagnetic coil 41 are drawn out of the flange portion 422 of the bobbin 42 through the notch 423 formed in the flange portion 422.

Following this, one end of the electromagnetic coil 41 is fitted into the first groove portion 424a formed in the left part of the connector mounting portion 424, and the other end of the electromagnetic coil 41 is fitted into the third groove portion 424c formed in the right part of the connector mounting portion 424. Here, both ends of the electromagnetic coil 41 are bent opposite to each other.

Following this, one lead wire of the diode is fitted into the second groove portion 424b formed in the left part of the connector mounting portion 424, and the other lead wire of the diode is fitted into the fourth groove portion 424d formed in the right part of the connector mounting portion 424.

The power supply connector 43 is then attached to the connector mounting portion 424 of the bobbin 42, to integrate the bobbin 42 and the power supply connector 43. As a result, the first connector pin 431 of the power supply connector 43 is electrically connected to the one end of the electromagnetic coil 41 and the one lead wire of the diode, and the second connector pin 432 of the power supply connector 43 is electrically connected to the other end of the electromagnetic coil 41 and the other lead wire of the diode. In this state, the power supply connector 43 is merely attached to (press-fitted to) the connector mounting portion 424, and is removable from the connector mounting portion 424. Accordingly, in the case in which a defect such as a conduction failure is found between the electromagnetic coil 41 and the power supply connector 43, the defect can be easily corrected by, for example, replacing the power supply connector 43.

After this, the bobbin 42 to which the power supply connector 43 is attached is stored into the space (storage portion) defined by the outer cylindrical portion 441, the inner cylindrical portion 442, and the connecting portion 443 of the field core 44. Here, the distal part of the power supply connector 43 is exposed to the outside of the field core 44 from the through hole 443a formed in the connecting portion 443 of the field core 44. In other words, the power supply connector 43 protrudes from the through hole 443a, substantially in parallel with the axial direction of the field core 44. Since the power supply connector 43 does not protrude in the radially outward direction of the field core 44, the space radially outward from the field core 44 can be effectively used and the installation space of the electromagnetic clutch 1 can be reduced.

The through hole 443a is covered with the collar portion 43a formed on the outer peripheral surface of the power supply connector 43, from inside of the storage portion.

Following this, the space (storage portion) defined by the outer cylindrical portion 441, the inner cylindrical portion 442, and the connecting portion 443 of the field core 44 is filled with resin. The resin with which the space is filled hardens, thus sealing the electromagnetic coil 41 and fixing the proximal part of the power supply connector 43 and the bobbin 42 to the field core 44. This ensures insulation. The resin also seals the space between the connector mounting portion 424 of the bobbin 42 and the power supply connector 43. This ensures the waterproof performance of the electrically connected parts.

The depression 43c is formed on the outer peripheral surface of the power supply connector 43 on the proximal side. When resin is injected into the storage portion, unhardened resin flows into the depression 43c. As a result, the power supply connector 43 is firmly fixed to the field core 44. In particular, the fixing strength of the power supply connector 43 is further enhanced by the depression 43c that has the predetermined width from the proximal end toward the distal end of the power supply connector 43 and has the deepest part at the position that is closer to the distal end than the proximal end is.

A mounting plate 45 is then attached to the outer surface of the connecting portion 443 of the field core 44, thus completing the assembly of the electromagnetic coil unit 4. The electromagnetic coil unit 4 is stored in the rotor 2 in a state of being fixed to the housing 6 of the compressor via the mounting plate 45, as mentioned earlier.

In the electromagnetic clutch 1 described above, the electromagnetic coil 41 and the power supply line can be connected easily, and the storage portion needs to be filled with resin only once to ensure insulation performance, waterproof performance, and the like. The electromagnetic clutch 1 can thus be manufactured easily and the number of manufacturing steps and the manufacturing cost can be reduced significantly, as compared with the conventional technique.

Moreover, the depression 43c into which unhardened resin injected into the storage portion is allowed to flow is formed on the outer peripheral surface of the power supply connector 43 on the proximal side. Accordingly, the power supply connector 43 can be more firmly fixed by the resin with which the storage portion is filled.

Furthermore, the power supply connector 43 protrudes from the through hole 443a formed in the connecting portion 443 of the field core 44, substantially in parallel with the axial direction of the field core 44. This enables effective use of the space radially outward from the field core 44, and reduces the installation space of the electromagnetic clutch 1.

Although a preferred embodiment of the present invention has been described above, the present invention is not limited to the foregoing embodiment, and various modifications and changes are possible based on the technical idea of the present invention.

REFERENCE SYMBOL LIST

1 Electromagnetic clutch
2 rotor
3 Armature
4 Electromagnetic coil unit
5 Bearing
6 Housing of compressor
7 Rotary shaft of compressor
41 Electromagnetic coil
42 Bobbin
43 Power supply connector
43c Depression
44 Field core
45 Mounting plate
46 Resin
421 Cylindrical portion
422 Flange portion
423 Notch
424 Connector mounting portion
424a First groove portion (first coil groove portion)
424c Third groove portion (second coil groove portion)
431 First connector pin
432 Second connector pin
443a Through hole

The invention claimed is:

1. An electromagnetic clutch for intermittently transmitting power of a drive source to a driven device, the electromagnetic clutch comprising:
   a rotor rotated by the power of the drive source;
   an armature facing the rotor, and connected to a rotary shaft of the driven device; and
   an electromagnetic coil unit having an electromagnetic coil, and for causing, when power is supplied to the electromagnetic coil, the rotor and the armature to magnetically adhere to each other to enable the transmission of the power from the drive source to the driven device,
   wherein the electromagnetic coil unit includes:
   a bobbin having a connector mounting portion, and around which the electromagnetic coil is wound;
   a power supply connector attached to the connector mounting portion, to supply external power to the electromagnetic coil; and
   a field core having a storage portion in which a through hole is formed, a proximal part of the power supply connector and the bobbin being stored in the storage portion in a state in which a distal part of the power supply connector is exposed to the outside from the through hole, and the storage portion being filled with resin,
   wherein the power supply connector supplies the external power to the electromagnetic coil by being connected to a power connector, and the distal part of the power supply connector protrudes from the through hole, substantially in parallel with an axial direction of the field core.

2. The electromagnetic clutch according to claim 1, wherein a depression into which the resin in an unhardened state injected into the storage portion is allowed to flow is formed on an outer peripheral surface of the power supply connector on a proximal side.

3. The electromagnetic clutch according to claim 2, wherein the depression has a predetermined width from a proximal end toward a distal end of the power supply connector, and has a deepest part at a position that is closer to the distal end than the proximal end is.

4. The electromagnetic clutch according to claim 1, wherein the bobbin includes:
   a cylindrical portion having the electromagnetic coil wound around an outer peripheral surface thereof; and
   a flange portion provided at at least one end of the cylindrical portion, and having a notch in a part of an outer periphery thereof, and
   wherein the connector mounting portion is provided on an outer surface of the flange portion so that the connector mounting portion sandwiches the notch.

5. The electromagnetic clutch according to claim 4, wherein the connector mounting portion includes:
   a first coil groove portion positioned on one side of the notch, and in which one end of the electromagnetic coil is fitted; and
   a second coil groove portion positioned on an other side of the notch, and in which an other end of the electromagnetic coil is fitted, and
   wherein the power supply connector includes:

a first connector pin electrically connected to the one end of the electromagnetic coil in the first coil groove portion, when the power supply connector is attached to the connector mounting portion; and a second connector pin electrically connected to the other end of the electromagnetic coil in the second coil groove portion, when the power supply connector is attached to the connector mounting portion.

6. The electromagnetic clutch according to claim 1, wherein the power supply connector does not protrude in the radially outward direction of the field core.

7. An electromagnetic clutch for intermittently transmitting power of a drive source to a driven device, the electromagnetic clutch comprising:

a rotor rotated by the power of the drive source;

an armature facing the rotor, and connected to a rotary shaft of the driven device; and an electromagnetic coil unit having an electromagnetic coil, and for causing, when power is supplied to the electromagnetic coil, the rotor and the armature to magnetically adhere to each other to enable the transmission of the power from the drive source to the driven device, wherein the electromagnetic coil unit includes:

a bobbin having a connector mounting portion, and around which the electromagnetic coil is wound;

a power supply connector attached to the connector mounting portion, to supply external power to the electromagnetic coil; and a field core having a storage portion in which a through hole is formed, a proximal part of the power supply connector and the bobbin being stored in the storage portion in a state in which a distal part of the power supply connector is exposed to the outside from the through hole, and the storage portion being filled with resin, wherein a depression into which the resin in an unhardened state injected into the storage portion is allowed to flow is formed on an outer peripheral surface of the power supply connector on a proximal side.

8. The electromagnetic clutch according to claim 7, wherein the depression has a predetermined width from a proximal end toward a distal end of the power supply connector, and has a deepest part at a position that is closer to the distal end than the proximal end is.

* * * * *